(12) United States Patent
Bassi et al.

(10) Patent No.: US 6,716,344 B1
(45) Date of Patent: Apr. 6, 2004

(54) LIQUID-SOLIDS CIRCULATING FLUIDIZED BED

(75) Inventors: Amarjeet Singh Bassi, London (CA); Jingxu Zhu, London (CA); Qing Dao Lan, London (CA); Argyrios Margaritis, London (CA); Ying Zheng, Fredericton (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 09/676,453

(22) Filed: Oct. 2, 2000

(51) Int. Cl.[7] .................. B01D 15/02; B01D 24/36
(52) U.S. Cl. ............... 210/189; 210/268; 210/269; 210/284; 210/664; 210/676
(58) Field of Search ................ 210/661, 676, 210/189, 268, 269, 284

(56) References Cited

U.S. PATENT DOCUMENTS

| | | | | |
|---|---|---|---|---|
| 3,492,092 A | * | 1/1970 | Higgins | 210/676 |
| 3,682,312 A | * | 8/1972 | Stevenson | 210/189 |
| 3,879,287 A | | 4/1975 | Porter | 210/676 |
| 3,969,243 A | * | 7/1976 | Arion | 210/189 |
| 4,279,755 A | | 7/1981 | Himsley | 210/661 |
| 5,789,640 A | | 8/1998 | Jin et al. | 585/467 |

OTHER PUBLICATIONS

"Purification of Proteins by adsorption chromatographyin Expanded Beds" Chase—TIBTECH Aug. 1994 (vol. 12).

"Continuous Affinity Chromatography Using a Magnetically Sterilized Fluidized Bed."—Burns & Graves—Bioseparation Progress Vl. No. 2 1985.

"Optimization and Simulation of continuous affinity–recycle extraction (car)" Gordon et al—Bioseparation 1: 19–21 1990.

"Radical Nonuniformity of Flow Structures in a Liquid–Solid Circulating Fluidized Bed"; Liang et al.; Chemical Engineering Science vol. 51 No. 10 pp. 2001–2010; 1996.

"Flow characteristics of the liquid–solid circulating fluidized bed"; Liang et al.; powder technology 90 (1997) pp. 95–102.

"Effect of Radical Flow Nonuniformity on the Alkylation Reaction in a Liquid–Solid Circulating Fluidized Bed(LSCFB) Reactor"; Liang and Zhu; Ind. Eng. Chem. 1997, 36 pp. 4651–4658.

"The Axial Hydrodynamic Behavior in a Liquid–Solid Circulating Fluidized Bed"; Ying et al.; The Canadian Journal of Chemical Engineering, vol. 77 Apr. 1999.

"(Gas–) Liquid–Solid Circulating Fluidized Beds and their Potential Applications to Bioreactor Engineering"; Zhu et al.; The Canadian Journal of Chemical Engineering, vol. 78 Feb. 2000.

\* cited by examiner

*Primary Examiner*—Ivars C. Cintins
(74) *Attorney, Agent, or Firm*—C. A. Rowley

(57) ABSTRACT

A continuous Liquid-Solids Circulating Fluidized Bed (LSCFB) preferably for use as an ion exchanger consists of two fluidized bed columns, a fluidized bed adsorber (downer) operating in conventional fluidized bed mode for adsorption of ions of interest and a fluidized bed riser for desorption of ions (operating as a riser fluidized bed) to provide regenerated particles. Ion exchange particles circulate continuously between the riser and the downer i.e. the particles that have adsorbed ions in the absorber pass from the adsorber (downer) to the desorber where they are regenerated and the so regenerated particles are return to the adsorber near the top of the adsorber column. The LSCFB can be used in processes for continuous recovery of the ions of interest.

11 Claims, 1 Drawing Sheet

LIQUID-SOLIDS CIRCULATING FLUIDIZED BED

FIELD OF THE INVENTION

The present invention relates to a fluidized bed, more specifically, a liquid-solids circulating fluidized bed arrangement specially suited for ion exchange processes.

BACKGROUND TO THE INVENTION

Fluidized beds have been used for a number of different applications such as a gas-liquid, gas-liquid-solid contactors and to carry out a variety of different processes such as chemical reactions.

Fluidized beds have found application in ion exchange process. For example Chase, H. A., "Purification of Proteins by Adsorption Chromatography in Expended Beds", TIBTECH 12, 296–303 (1994) describes a batch ion exchange process using a conventional fluidized bed for recovering proteins from whole fermentation broth with the presence of bacterial cells. It eliminates the difficult solids separation step and recovers the desired products directly from unclarified whole broth. This process is a batch process employing a conventional fluidized bed.

Burns, M. A. and D. J. Graves, "Continuous Affinity Chromatography Using a Magnetically Stabilized Fluidized Bed", Biotechnology Progress 1, 95–103 (1995) suggested a two-column magnetically stabilized fluidized bed system for the continuous chromatography of biochemical products. The magnetically stabilized fluidized bed system is considered to be complicated and costly.

Gordon, N. F., H. Tsujimura and C. L. Cooney, "Optimization and Simulation of Continuous Affinity Recycle Extraction", Bioseparation 1, 9–12 (1990) describes a process using mixed reactors as opposed to fluidized bed and reported the continuous affinity recycle extraction of proteins using well-mixed reactors. This system, although simple and easy to control, has the disadvantage of a stirred tank system—the ion exchange efficiency is low and large processing volumes are essential for even a moderate throughput requirement Porter and Robert, U.S. Pat. No. 3,879,287, "Continuous ion exchange process and apparatus" (1975) relates to an apparatus for continuous ion exchange. However, the process described is a semi-continuous process as the recommended eluting means is a batch wise conventional fixed bed ion exchange process.

Himsley and Alexander, U.S. Pat. No. 4,279,755: Continuous countercurrent ion exchange process (1993) teaches a continuous countercurrent ion exchange process for absorbing ions of interest onto ion exchange particles from a feed liquor containing ions which when absorbed on the particles cause the density of the particles to increase. The process comprises the steps of (1) flowing the feed liquor upwardly through a main bed of ion exchange resin particles contained in a main chamber of an absorption column and thereby maintaining the bed in fluidized state; (2) continuously collecting the denser loaded particles from the lower region of the absorption column; (3) passing an outflow of the feed liquor from the upper region of the main chamber upwardly into the lower region of the polishing chamber containing a secondary bed of fluidized ion exchange resin particles whereby residual ions of interest are polished from the liquor, and (4) producing a barren liquor flowing out of the upper region of the polishing chamber. Again, this is a semi-continuous process as the stripping and the regeneration of the loaded ion exchange particles cannot be performed in this device.

BRIEF DESCRIPTION OF THE PRESENT INVENTION

It is an object of the present invention to provide a circulating fluidized bed system for liquid solids contact and interaction, more specifically a Liquid-Solids Circulating Fluidized Bed (LSCFB) ion exchanger.

It is also an object of the present invention to provide a process for continuous recovery of the ions of interest for example contaminants in liquid streams or value added products from waste steam using a Liquid-Solids Circulating Fluidized Bed (LSCFB) ion Exchange system.

Broadly the present invention relates to a fluidized bed system comprising a first fluidized bed, means to feed solids into said first fluidized bed adjacent to a first end of said first fluidized bed and means to feed a first fluid into said first fluidized bed adjacent to a second end of said first fluidized bed, said second end being remote from said first end so that said solids and said first fluid flow in counter current, a second fluidized bed, said second fluidized bed being an entraining fluidized bed wherein a means for introducing solids and a means for introducing a second fluid into said second bed are both adjacent to the one end of said second fluidized bed so that said solids and said second fluid introduced into said second bed flow concurrently through said second bed from said one end toward another end of said second fluidized bed remote from said one end, first means connecting said first fluidized bed to said second fluidized bed adjacent to said second end of said first fluidized bed and said one end of said second fluidized bed and said first means connecting including said means to feed solids into said second fluidized bed, and second means connecting said first and said second fluidized beds adjacent said first end of said first bed and said other end of said second fluidized bed, and said second means connecting including said means to feed solids into said first fluidized bed.

Preferably said first and second fluidized beds are substantially vertical columns. Preferably said second means connecting said first and said second fluidized beds includes a separator means for separating solids from fluid and exhausting such separated fluid to provide separated solids.

Preferably second means connecting said first and said second fluidized beds further includes a washer for washing said solids before they are feed into said first end of said first fluidized bed.

Preferably said first means connecting said first and said second fluidized beds includes a second washer washing solids adjacent to said second end of said first fluidized bed before they are introduced into said second fluidized bed.

Preferably said first fluidized bed is an absorber for separating ionic products of interest and said second fluidized bed is a desorber for desorption of ionic products and said solids are ion exchange particles. That is, the said liquid-solid circulating fluidized bed system can preferably be used to recover ionic products of interest by passing ion exchange particles in countercurrent flow with a feed stream of a first fluid through a first fluidized bed for adsorption of ionic products of interest from said feed stream of said first fluid, transferring said particles with adsorbed ionic products of interest from said first fluidized bed to a second fluidized bed and passing said ion exchange particles with absorbed ionic products in countercurrent flow with an extract buffer of a second fluid through said second fluidized bed for desorption of said adsorbed ionic products of interest, separating said second fluid containing said ionic products of interest desorbed from said ion exchange particles by said second fluid to provide regenerated ion exchange particles and returning said regenerated ion exchanged particles into said first fluidized bed to flow in countercurrent with said first fluid.

Preferably said ion exchange particles with absorbed ionic products are washed before being introduced into said second fluidized bed.

Preferably said regenerated ion exchange particles are washed before being returned to said first fluidized bed Preferably said ionic product is a protein and said first fluid is a fermentation broth.

Preferably said ionic product is a metal and said first fluid is seawater.

Preferably said ionic product is an enzyme and said first fluid is dextrose syrup.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
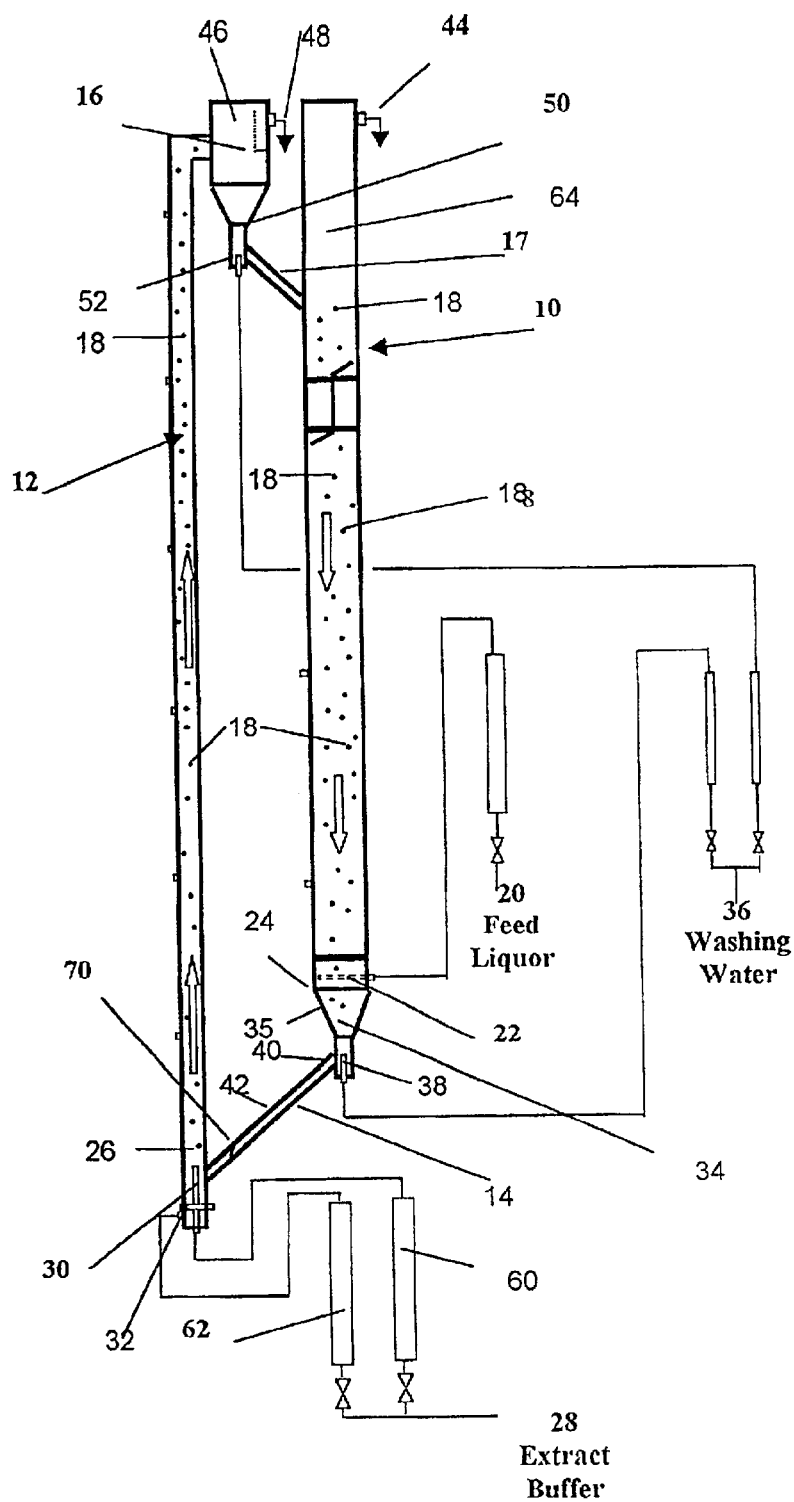
FIG. 1 is a schematic illustration of the method and apparatus of the present invention

Referring to FIG. 1 the present invention is composed of a pair of fluidized beds a first fluidized bed 10 and a second fluidized bed 12 interconnected at their adjacent ends by solid transfer and washing systems generally indicated at 14 and 16 respectively. The first fluidized bed 10 is a conventional counter-current flow bed wherein solids (solid particles such as ion exchange beads) as indicated at 18 enter adjacent to the top of the bed 10 as indicated by the line 17 and flow downward and a first fluidizing fluid namely the feed liquor 20 enters the bed 10 as indicated schematically at 22 at the lower end 24 of the bed 10 and flows upward in counter current with the particles 18.

The second fluidized bed 12 on the other hand is a riser fluidized bed wherein the solid particles 18 transferred from bed 10 via transfer system 14 enter the bed 12 adjacent to the lower end 26 of the bed 12 and flow upward in co-current relation with a second fluidizing fluid 28 (such as extract buffer) which enters the bed 12 under pressure in the illustrated arrangement via nozzle 30 and inlet 32 both adjacent to the lower end 26 of the bed 12 and flows upward through the bed 12 carrying the particles 18 in its flow.

The distributor of the second fluidized bed 12 divides the incoming stream of extracting buffer 28 into two substreams: the primary 60 and the auxiliary 62 streams. The primary stream 60 is introduced through nozzle 30 which projects into the second fluidized bed column 12. This design increased the pressure drop across the bottom solids return pipe 42 and makes the system more stable. The auxiliary stream 62 is introduced into the bottom 26 of the second fluidized bed 12 through a perforated plate inlet 32. The function of the auxiliary stream 62 is to stir up the particles at the bottom of the second fluidized bed 12 to be entrained up the second fluidized bed by the combination of the primary and auxiliary liquid streams 60 and 62. The two streams 60 and 62 may also be combined into a single stream and the fed through a single distributor at the second fluidized bed 12 bottom end 26.

As above indicated the solid particles 18 enter at inlet 17 and travel downward through the bed 10. After they have traversed the fluidized bed 10 the particles 18 enter into the transfer system 14 which includes a washing stage 34 in a conical or funnel shaped bottom end 35 of the housing containing the bed 10 and into which wash water from a source is injected via nozzle 38 positioned adjacent to the apex of the cone in the bottom outlet 40 of the bed 10. The injected wash water 36 travels in counter current to and washes the particles 18 when they leave the fluidized bed 10. The wash water dilutes the feed stream and exits from the top of bed 10 through outlet 44. The washed particles 18 then pass via transfer pipe 42 and are introduced into the second fluidized bed 12.

The function of the wash section 34 is to rinse the loaded particles 18 and to prevent the feed stream 20 from being carried to the second fluidized bed 12 by the particles 18. The bottom solids return pipe 42 is located below the wash section 34. It connects the bottoms of the first fluidized bed 10 and the second fluidized bed 12. During operations, loaded ion exchange particles are transported into the base of the second fluidized bed 12 through the bottom solids return pipe 42 to make up the particles 18 entrained up along the second fluidized bed 12. The bottom solids return pipe 42 operates as a packed moving bed. This is the most important mechanism for forming the dynamic seal between the second fluidized bed 12 and the first fluidized bed 10. The dynamic seal is critical for the success of this continuous ion exchange process, which employs two liquid streams of different properties.

In the LSCFB ion exchange system of the present invention, the solids circulation rate is controlled by a butterfly valve schematically indicated at 70 located on the bottom solids return pipe 42. The mechanical valve is preferred over a hydraulic valve due to the low density of most ion exchange particles, which makes the operation of the hydraulic valve more difficult. An additional advantage of using the mechanical valve in this situation is that it enhances the pressure drop across the solids return pipe 42 and therefore makes the system more stable. The auxiliary liquid stream 62 may be used to provide additional control of the solids circulation rat.

The fed liquor 20 as above described enters at the bottom of the bed 10, travels in countercurrent to the particles 18 trough the bed 12 and leaves at the top of the bed as indicated at 44. The fluid exiting from 44 is discarded as waste or as a purified stream in the case of contaminant removal.

The second fluidizing fluid (extract buffer) 28 and the particles 18 from line 42 travel in co-current fashion upward through the bad 12 and are regenerated and then enter the transfer system 16 which includes a separator such as the fluid vortex type separator 46 having a fluid outlet 48 through which the second fluidizing fluid 28 is removed and a solids outlet through a wasting stage 50 at the bottom. This fluid exiting from outlet 48 contains the ions of interest and may be subjected to further downstream processing or membrane treatment to concentrate the ions of interest. Washing fluid is injected via nozzle 52 at the bottom of the washing stage 50 and flow upward in countercurrent with the downcoming solids (regenerated solid particles) 18 and the so washed particles 18 enter the inlet tube delivering the regenerated particles 18 into the top of the bed 10. The washing fluid dilutes the extract buffer and exits from the outlet 48.

The operation of the invention will be described in relation to ion exchange process, but it may be used in other potential application as described below.

In the process of ion exchange, the feed liquor 20 is introduced via inlet 22 into the bottom (second) end of the first fluidized bed 10 (downcomer 10) and the regenerated particles 18 from the bed 12 are introduced via line 17 adjacent to the first or the top of the first fluidized bed 10, i.e. the feed 20 and regenerated beads are introduced at opposite ends of the first fluidized bed 10.

The falling particles 18 and the up-flowing feed liquor 20 contact counter-currently and the target ions in the feed 20 are adsorbed onto the ion exchange particles 18 in the first fluidized bed 10. The de-ionized liquor leaves from the top of the first fluidized bed through the raffinate outlet 44 and the loaded particles 18 fall into the washing stage 34 at the base of the first fluidized bed 10 are rinsed and then transferred via line 42 to the base of the second fluidized bed 12.

During operations, as above described loaded ion exchange particles are transported into the base of the second fluidized bed 12 through the bottom solids return pipe 42 to make up the particles 18 entrained up along the second fluidized bed 12. The bottom solids return pipe 42 operates as a packed moving bed forming the dynamic seal between the second fluidized bed 12 and the first fluidized bed 10.

The extracting buffer 28 is applied to the second fluidized bed 12 at the bottom. The superficial liquid velocity in the second fluidized bed 12 is maintained in a range higher than the terminal velocity of the ion exchange particles 18 so that the loaded particles are carried upward by the upflowing buffer 28. The buffer 28 and the loaded ion exchange particles 18 hence contact co-currently while desorption and regeneration of the particles 18 proceed in the second fluidized bed 12. The extract 28 and the regenerated ion exchange particles 18 are separated by a liquid-solids separator 46 adjacent to the top of the second fluidized bed 12. The extract is then collected from the extract outlet 48 and the regenerated ion exchange particles 18 returned to the first fluidized bed 10 through the top solids return pipe 17, after being rinsed through the wash section 50.

The liquid-solids separator 46 in the illustrated arrangement is a hydraulic (but can be any other type of separator) cyclone, which separates the regenerated particles 18 from the extract 28. The extract outlet 48 is located on the separator preferably at the same level as that of the raffinate outlet 44 on the top of the first fluidized bed 10 to maintain the pressure balance between the second fluidized bed 12 and the first fluidized bed 10. To prevent the loss of particles through the extract outlet, a stainless steel mesh (not shown) is preferably used to cover the extract outlet 48.

The top washing section 50 comprises of the funnel bottom of the separator and return pipe 17. The upward washing water slows down the falling of the particles 18 and creates a solids layer in the funnel bottom of the separator 46. It also rinses the particles 18 before their falling into the top solids return pipe 17 and minimizes the inter-mixing between the extract in the second fluidized bed 12 and the de-ionized liquor at the top of the first fluidized bed 10. The return pipe 17 (particle inlet to the first fluidized bed 10) enters the first fluidized bed 10 sufficiently below the outlet 44 to maintain a freeboard section 64 in the upper part of the first fluidized bed 10 of sufficient height to substantially eliminate carry over of particles 18 through the outlet 44.

APPLICATIONS OF THE PRESENT INVENTION

A feed liquor 20 from which ions can be recovered, such as a fermentation broth, usually contains a large amount of small solids and relatively low concentration of desired product(s). Hence, the first task in developing a new downstream treatment process usually focuses on the selection of an appropriate procedure for handling the solids present in the feed. This is typically achieved by filtration or centrifugation. However, the presence of colloidal solids and the viscous properties of many feeds frequently make those methods both costly and inefficient. The LSCFB ion exchange system of the present invention is an integrated unit operation which can recover desired ions from unclarified whole broth continuously.

The desorption of the target ions and the regeneration of the ion exchange particles are carried out in the second fluidized bed 12. The loaded ion exchange particles 18 are transported into the base of the second fluidized bed 12 through the bottom solids return system 14 and flow co-currently upward with the extracting buffer 28 along the second fluidized bed 12. The loaded particles are stripped of the target ions and regenerated in the second fluidized bed 12 before being entrained into the liquid-solids separator 46 of the transfer system 16. As the second fluidized bed 12 is operated in the circulating fluidization regime with high liquid velocity, the contact efficiency and the mass transfer rate between the liquid and solids are very high.

In the liquid solids circulating fluidized bed (LSCFB), diagrammed in FIG. 1, the absorption in the first fluidized bed or downcomer 10 and the desorption in the second fluidized bed or second fluidized bed 12 can be carried out in a continuous. The ion exchange particles 18 employed in this system should have reasonably large absorption capacity to the target or desired ions and the density of the ion exchange particles 18 in the swollen state should be larger than that of the feed liquor. As the first fluidized bed 10 is maintained in the conventional fluidization regime, the bed voidage could be adjusted to allow the passage of the particulates in an unclarified feed by controlling the superficial liquid velocity in th first fluidized bed. In other words, this system can be used to purify the target ions directly from an unclarified whole broth so that the costly pre-clarification process is eliminated.

In the LSCFB, the adsorption of the target ions are carried out in the first fluidized bed 10 and the desorption and the regeneration in the second fluidized bed 12. This is a continuous process with the ion exchange particles 18 circulated continuously between the two columns 10 and 12. Two different liquid streams, the feed 20 in the first fluidized bed 10 and the extracting buffer 28 in the second fluidized bed 12, are used in this system. The second fluidized bed 12 is operated in the circulating fluidization regime and the first fluidized bed in the conventional fluidization regime.

EXAMPLES

In arrangement as shown in FIG. 1, the second fluidized bed 12 is an acrylic column of I.D. 38.1 mm and 3 m in height. The distributor of the second fluidized bed 12 divides the incoming stream of extracting buffer into two sub-streams: the primary 60 and the auxiliary 62 streams. The primary stream 60 is introduced through a stainless steel pipe (I.D. 11 mm) (nozzle 30). It project 36 mm into the second fluidized bed column 12. Since the liquid velocity in the second fluidized bed is maintained in a range higher than the terminal velocity of the ion exchange paricles, the high liquid velocity enhances the contact efficiency and also the mass transfer rate between the liquid and the particles.

The top washing section 50 as above described comprises of the funnel bottom of the separator 46 and an acrylic pipe of 40 mm in diameter and 200 mm in height (pipe 17). The first fluidized bed is a Plexiglas column of I.D. 120 mm and 2.5 m in height. The particle entrance 17 on the first fluidized bed 10 is located 0.813 m below the raffinate outlet 44 to prevent the direct loss of particles through the raffinate outlet 44. The distributor 22 of the first fluidized bed 10 is a perforated stainless steel pipe. This distributor allows the particles to fall through to the bottom solids return pipe 42 while introducing the feed 20 to the first fluidized bed 10.

The bottom washing section 34 is comprised of the funnel bottom of the first fluidized bed 10 and a vertical pipe 40 of 40 mm I.D. and 200 mm in height. Wash water is introduced from the base of this column and goes upward (nozzle 38).

In the LSCFB ion exchange system, the solids circulation rate is controlled as above described by a butterfly valve 70 located on the bottom solids return pipe 42.

Table 1 summarizes the experimental result conducted using the apparatus as above described, with whole whey which contains approximately 5.4 g/L proteins and with an artificial protein solution, the 2 g/L bovine albumin serum (BSA) solution. The protein recovery from BSA solution was much higher than that from the whey solution. This is because the high ionic strength and the fouling effects of the milk-fats in whey solution reduced the dynamic capacity of the system.

TABLE 1

Summary of parameters of whey protein recovery under different conditions

| Feed Type | Protein Conc. in Feed (g/L) | Feed Flow rate (L/hr) | Protein Loading Rate (g/hr) | Protein Conc. in Raffinate (waste feed (g/L) | Overall Recovery (%) | Throughput (g/hr · kg beads)) |
|---|---|---|---|---|---|---|
| Whey | 5.4 | 5.7 | 31.2 | 0.77 | 78.4 | 8.2 |
| BSA Solution | 2.0 | 38.4 | 76.8 | 0.79 | 84.0 | 21.5 |

POTENTIAL TECHNOLOGY APPLICATIONS

Potential applications of the invention that the invention is believed to be suitable for include but are not limited to.
a) The recovery of ionic products from biological or non-biological feeds such as protein recovery from fermentation broth, metal recovery from sea water, etc. where suitable ion exchange particles are available,
b) The removal of ionic contaminants from products or intermediate products, e.g., removal of enzyme from dextrose syrup after the conversion;
c) The desalination of water;
d) Wastewater treatment.

IN SUMMARY

Ion Exchange of Target Ions Occurs by:

1. Regenerated ion exchange particles are fed to the first fluidized bed through the top solids return pipe; those particles flow down to the lower part of the first fluidized bed to form a particulate bed;
2. The feed liquor flows upward through the down moving bed of ion exchange particles and maintains the bed in the conventional fluidized regime;
3. The target ions are adsorbed onto the ion exchange particles when the ion exchange particles and the feed contact counter-currently in the particulate bed;
4. The de-ionized liquid is discarded from the raffinate outlet and the loaded ion exchange particles fall into the bottom wash section;
5. The rinsed ion exchange particles are continuously transported to the second fluidized bed through the bottom solids return pipe;
6. Extracting buffer is fed into the base of the second fluidized bed and flows upward at a velocity higher than the terminal velocity of the particles, thereby maintained in a circulating fluidization regime;
7. The loaded particles are desorbed and regenerated while being entrained up continuously along the second fluidized bed;
8. The regenerated particles are separated from the extract in the liquid-solids separator at the top; the extract is collected from the extract outlet on the liquid-solid separator and the regenerated particles are rinsed in a wash section below the separator;
9. The rinsed particles are fed to the first fluidized bed by gravity. Another cycle begins.

Having described the invention, modifications will be evident to those skilled in the art without departing from the spirit of the invention as defined in the appended claims.

What is claimed is:

1. A liquid-solid circulating fluidized bed system comprising a first liquid fluidized bed, means to feed solids into said first fluidized bed adjacent to a first end of said first fluidized bed and means to feed a first fluid into said first fluidized bed adjacent to a second end of said first fluidized bed, said second end being remote from said first end so that said solids and said first fluid flow in counter current, a second liquid fluidized bed, said second liquid fluidized bed being an entraining liquid fluidized bed wherein a means for introducing solids and a means for introducing a second fluid into said second bed are both adjacent to one end of said second fluidized bed so that said solids and said second fluid introduced into said second bed flow concurrently through said second bed from said one end toward another end of said second fluidized bed remote from said one end, first means connecting said first fluidized bed to said second fluidized bed adjacent to said second end of said first fluidized bed and said one end of said second fluidized bed, said first connecting means includes means to feed said solids into said second fluidized bed, second means connecting said first and said second fluidized beds adjacent said first end of said first bed and said other end of said second fluidized bed, said first means connecting includes means forming a packed moving bed dynamic seal between said first and second fluidized beds and said second means connecting includes said means to feed solids into said first fluidized bed.

2. A liquid-solid circulating fluidized bed sin as defined in claim 1 wherein said first and second liquid fluidized beds are substantially vertical columns.

3. A liquid-solid circulating fluidized bed system as defined in claim 2 wherein said first end of said first fluidized bed is the top end, said second end of said first fluidized bed is the bottom end, said one end of the second fluidized bed is the bottom end and said other end of said second fluidized bed is the top end.

4. A liquid-solid circulating fluidized bed system as defined in claim 3 wherein said first fluid essentially flows upwards and said solids essentially flow downwards to form a counter current flow in said first fluidized bed, and wherein said second fluid and solids both essentially flow upwards concurrently in the second fluidized bed.

5. A liquid-solid circulating fluidized bed system as defined in claim 4 wherein second means connecting said first and said second liquid fluidized beds includes a washer for washing said solids before they are fed into said first end of said first fluidized bed.

6. A liquid-solid circulating fluidized bed system as defined in claim 5 wherein said second means connecting said first and said second liquid fluidized beds further includes a separator means for separating solids from fluid and exhausting such separated fluid to provide separated solids.

7. A liquid-solid circulating fluidized bed system as defined in claim 4 wherein said first means connecting said first and said second liquid fluidized beds includes a second washer for washing solids adjacent to said second end of said first fluidized before they are introduced into said second fluidized bed.

8. A liquid-solid circulating fluidized bed system as defined in claim 4 wherein second means connecting said first and said second liquid fluidized beds includes a washer for washing said solids before they are fed into said first end of said first fluidized bed, and a separator means for separating solids from fluid and exhausting such separated fluid to provide separated solids.

9. A liquid-solid circulating fluidized bed system as defined in claim 8 wherein said first means connecting said first and said second liquid fluidized beds includes a second washer for washing solids adjacent to said second end of said first fluidized before they are introduced into said second fluidized be.

10. A liquid-solid circulating fluidized bed system as defined in claim 1 wherein second means connecting said first and said second liquid fluidized beds includes a washer for washing said solids before they are fed into said first end of said first fluidized bed, and a separator means for separating solids from fluid and exhausting such separated fluid to provide separated solids.

11. A liquid-solid circulating fluidized bed system as defined in claim 10 wherein said first means connecting said first and said liquid second fluidized beds includes a second washer for washing solids adjacent to said second end of said first fluidized before they are introduced into said second fluidized bed.

* * * * *